United States Patent
Lyons

(10) Patent No.: US 12,213,564 B2
(45) Date of Patent: Feb. 4, 2025

(54) METHOD FOR OPTIMISING INDIVIDUALLY MADE-TO-MEASURE ITEMS OF CLOTHING

(71) Applicant: EEKUAL BIONIC GMBH, Cologne (DE)

(72) Inventor: William Lyons, Cologne (DE)

(73) Assignee: EEKUAL BIONIC GMBH, Cologne (DE)

( * ) Notice: Subject to any disclaimer, the term of this patent is extended or adjusted under 35 U.S.C. 154(b) by 0 days.

(21) Appl. No.: 17/905,713

(22) PCT Filed: Mar. 4, 2021

(86) PCT No.: PCT/EP2021/055519
§ 371 (c)(1),
(2) Date: Sep. 6, 2022

(87) PCT Pub. No.: WO2021/176018
PCT Pub. Date: Sep. 10, 2021

(65) Prior Publication Data
US 2023/0112107 A1    Apr. 13, 2023

(30) Foreign Application Priority Data

Mar. 6, 2020 (DE) ...................... 10 2020 106 181.1
May 4, 2020 (DE) ...................... 10 2020 111 939.9

(51) Int. Cl.
*A43D 1/02* (2006.01)
*A41H 1/02* (2006.01)
*G05B 15/02* (2006.01)

(52) U.S. Cl.
CPC ............... *A43D 1/025* (2013.01); *A41H 1/02* (2013.01); *G05B 15/02* (2013.01)

(58) Field of Classification Search
CPC .................................. A41H 1/02; A41H 3/007
(Continued)

(56) References Cited

U.S. PATENT DOCUMENTS 9,462,838 B1   10/2016  Smith et al.
2002/0103566 A1*  8/2002  Gadson .................. G06Q 30/06
                                                        700/132
(Continued)

FOREIGN PATENT DOCUMENTS

DE    102016201151 A1    7/2017
DE    202018005828 U1    3/2019
(Continued)

OTHER PUBLICATIONS

International Search Report issued May 14, 2021 re: Application No. PCT/EP2021/055519; pp. 1-3; citing: EP 3199046 A1, US 2010324455 A1, WO 2018085811 A1, WO 2006131714 A1, US 2009107009 A1, US 2017249783 A1, US 215351493 A1.
(Continued)

*Primary Examiner* — Nathan E Durham
(74) *Attorney, Agent, or Firm* — CANTOR COLBURN LLP

(57) ABSTRACT

A method for optimizing individually tailored garments includes
  measuring at least one body part and generating a first data set for manufacturing the garment, including measured data,
  manufacturing the garment based on the data, the garment including a passive indicator element via which properties and/or changes of the garment due to wear is determined, and
  use of the first garment. The method includes
  examining the first garment regarding changes due to wear for producing a second similar garment, thereby
  generating a second data set containing measured data of the first garment,
  comparing the second and first data sets,
  and checking the passive indicator element with regard to information relevant to producing the second garment. Then,
(Continued)

a third data set based on the first and second data sets, and the result from the passive indicator element check is generated, and the second garment is manufactured based on the third data set.

18 Claims, 4 Drawing Sheets

(58) Field of Classification Search
USPC .................................................. 700/130–133
See application file for complete search history.

(56) References Cited

U.S. PATENT DOCUMENTS

| | | | |
|---|---|---|---|
| 2009/0107009 A1 | 4/2009 | Bishop et al. | |
| 2010/0324455 A1 | 12/2010 | Rangel et al. | |
| 2013/0144424 A1* | 6/2013 | Jarbouai | A41H 3/007 700/134 |
| 2014/0277683 A1* | 9/2014 | Gupta | G06F 30/00 700/132 |
| 2015/0351493 A1 | 12/2015 | Ashcroft et al. | |
| 2017/0205801 A1 | 7/2017 | Manning et al. | |
| 2017/0249783 A1 | 8/2017 | Mach Shepherd et al. | |
| 2018/0256073 A1 | 9/2018 | Kennedy et al. | |

FOREIGN PATENT DOCUMENTS

| | | |
|---|---|---|
| DE | 102018105205 A1 | 9/2019 |
| DE | 102018006229 A1 | 2/2020 |
| DE | 102019203892 A1 | 9/2020 |
| DE | 102019108820 A1 | 10/2020 |
| DE | 102019108821 A1 | 10/2020 |
| DE | 102019108822 A1 | 10/2020 |
| EP | 3199046 A1 | 8/2017 |
| JP | 2007267996 A | 10/2007 |
| JP | 2017131630 A | 8/2017 |
| WO | 2006131714 A1 | 12/2006 |
| WO | 2018085811 A1 | 5/2018 |

OTHER PUBLICATIONS

Hansen et al, "Evolutionary Algorithms for the Fully Automatic Measurement of Complex Natural Geometries Using the Example of Human Body Measurement" Technisches Messen 66 (1999), 22 pages with English translation.

* cited by examiner

METHOD FOR OPTIMISING INDIVIDUALLY MADE-TO-MEASURE ITEMS OF CLOTHING

TECHNICAL FIELD

The present disclosure relates to a method for optimizing individually tailored garments, in particular shoes or jackets.

BACKGROUND

Tailor-made garments require that the corresponding body parts, to which the garments are to be adapted, are measured as accurately as possible. Subsequently, the garments must be accurately manufactured on the basis of the data set collected from the measurement.

Numerous methods for measuring body parts are known. Body parts are usually measured using a tape measure, for example, which is both time-consuming and error-prone. It is possible to make mistakes both when positioning the tape measure and when reading off the values.

For example, the design and manufacture of custom-made shoes is very time-consuming because measuring the feet in particular is difficult and requires a great deal of time. Furthermore, errors can occur when transferring the measurement data to the shoe elements that are ultimately to be manufactured.

It should also not be underestimated that, especially in the case of shoes, even if the measurements are correct, pressure points can occur that only become apparent when the shoe is worn. For example, it is possible that feet change shape or deform under load due to the gait pattern and thus press against areas of the shoe. Such pressure points do not occur in the resting state, i.e. when the user is merely standing.

Independently of this, however, problems can also arise as a result of the tailored garments changing through use. For example, shoes can become worn on one side, and jackets, pants and tops can wear out in certain areas due to abrasion.

Also, the microclimate inside the garment is of great importance to the user or wearer. It is often only during use that it becomes apparent that the material treatment or material selection of the garment is unfavorable for the user. For example, if the wearer of the garment tends to perspire, more air-permeable or lightweight materials should be applied in these areas. However, this information is typically not available when the garment is manufactured.

SUMMARY

The present disclosure provides a method for optimizing individually tailored articles of clothing, in particular shoes, which leads to improved or increased wearing comfort of the article of clothing. The method should be as simple as possible to carry out and suitable for a high degree of automation.

According to the disclosure, the task is solved by a method for optimizing individually tailored garment of the same type with the following steps:
  a. Measuring at least one body part and generating a first data set for manufacturing the garment, including measured data of the body part,
  b. Manufacturing a first garment based on the determined data set, wherein the garment comprises of at least one passive indicator element via which properties and/or changes of the garment due to the use of the garment by a user can be determined,
  c. Use of the first garment by a user,
  d. Examining the used first garment with regard to changes due to the use by the wearer for the production of a second garment of the same type, thereby
    Generating a second data set containing measured data of the used first garment,
    comparing the second data set with the first data set,
    checking the passive indicator element with regard to information relevant to the production of the second garment,
  e. Generating a third data set based on the first data set, the second data set, and the result from the indicator element check,
  f. Manufacturing the second garment based on the third data set,
  g. Repeating as necessary the previous method steps d) to f), starting from the respective last garment produced and used, for further optimization of the fit and/or the properties of the respective new garment to be produced.

The disclosure is thus based, among other things, on the idea that feedback from the use of the previously manufactured garment is consistently taken into account in the production of individually tailored garments of the same type. The production of the different generations of garments takes place in a continuous loop. The method is adaptive, so to speak, resulting in garments that improve from generation to generation.

For the purposes of the disclosure, the term "garment of the same type" means that the garments of different generations essentially correspond to each other, in particular with regard to dimensions and material.

In this context, the optimization of the garment can be carried out individually from generation to generation of the garment with respect to only one user, but it is also possible to optimize a garment of the same type of different, i.e. multiple, users. This means, for example, that a data set containing the information of the respective indicator elements is generated from a large number of jackets of a certain collection, which was manufactured for several users, after use. Thus, it is possible to detect fundamental weaknesses of the product and avoid them in the next generation.

The adaptation of the next generation of the garment may, for example, involve reinforcing material in certain areas. For example, if a shoe wears heavily in the area of the big toe, this area can be reinforced accordingly. It is also conceivable that, in the case of an individual improvement for just one user, the sole of a shoe may be reinforced in a specific area if the user's gait pattern causes uneven wear. Pressure points can also be removed in this way.

According to the disclosure, the indicator elements are designed as passive indicator elements whose change can be registered and evaluated. In this respect, these differ from indicator elements with active elements which, for example, register and store data and forward it to a processor, for example by radio or an alternative technique. Passive indicator elements are significantly cheaper to manufacture, are easier to integrate into the design and cannot fail due to technical defects.

The term indicator element in the context of the disclosure covers, on the one hand, elements specifically added to the garment, which essentially have the function of serving as indicator elements. However, also elements of the garment which are present anyway and can be used as indicator elements. It is conceivable, for example, that the position of openings for laces, certain seams and their course, or other design elements, or their position relative in space or in reference to others can be used.

The indicator elements according to the disclosure can be implemented in such a way that they represent a kind of machine-readable binary code. In a particularly simple embodiment, this can be a colored dot that can be rubbed off by using the garment. Thus, in the second case, a camera can be used to quickly and easily determine whether or not the garment is worn in this area. If the colored dot is still visible, wear is low; if it is no longer visible, the garment is worn in this area.

The indicator elements are preferably read optically, for example by the camera already mentioned, a laser measurement method or, for example, also with the aid of ultrasound or infrared light. This is particularly useful in the case of indicator elements whose dimensions change, for example in the case of eroding elevations or increasing or decreasing depressions. The optical device may thus be suitable for directly measuring the changes in dimensions and forwarding the measurement results to a processor. The processor compares the newly determined measured data with the original measured data or dimensions of the indicator elements. Possible differences in the dimensions can then be used to adjust the data set on which the next generation of the garment is based, and thus the next garment itself, accordingly.

These can be recognizable colored dots, but according to the disclosure, colors or coatings that are barely or not at all visible to the human eye are also conceivable. For example, fluorescent dots can be provided which can only be recognized under appropriate light.

The color dots can be flush with the surrounding surface, but they can also be recessed. This ensures that the surrounding surface must first be abraded before the color dot is rubbed off. Of course, it is also possible to provide the color dots on elevations that protrude from the surrounding material.

Instead of color dots, it is also possible to provide only elements that protrude with respect to the surrounding surface, for example domes. If these are reduced or completely removed due to abrasion, there is obviously a high level of wear in this area. In this embodiment, not only can binary information be processed, it is also possible to determine the degree of wear. According to the disclosure, it is possible to determine the height of the domes or the change in height via their shadow cast by a defined distant light source.

It is also conceivable to provide depressions as indicator elements whose depth decreases in the course of use. According to the disclosure, it is also possible for recesses to determine the shadow cast by a defined, remote, elevated light source. The shadow cast by the radius of the recess is then used.

A change in the surface material can also serve as a passive indicator element, for example a special thread or an additional loop that changes or loses its shape due to wear. Also, a small ball may be incorporated that also changes or wears and/or is eventually lost. It is also conceivable that a series of small balls may be arranged, with either a single thread or several different threads running through them.

It is also conceivable that the garments have a material in certain areas that is made up of differently colored layers arranged one below the other. Thus, the color that can be seen from the outside changes with the degree of wear. For example, a blue layer may be followed by a red layer and finally a yellow layer. First the blue layer is worn away, then the red and finally the yellow layer.

The indicator elements can also be designed in such a way that other usable conclusions can be derived via them in addition to the wear. For example, the indicator elements can have coatings that can be used to register humidity, pH value, temperature, or the like. Such information can then in turn be used to draw conclusions about a microclimate within the garment in use. If, for example, the user sweats more on certain parts of his body than on others, indicator elements show this and the garment can be improved in the next generation to suit these conditions. For example, ventilation openings or just more breathable or thinner materials can then be provided in such areas. A suitable pH indicator is, for example, a coating of phenolphthalein.

In principle, of course, it is also possible for the indicator elements to be used equally as combination elements both for determining wear and for determining other data.

The same applies to a desired water impermeability of the garment. The indicator elements can be used to determine the points at which the garment is not optimally sealed against moisture. Penetrating moisture can be detected and prevented in the next generation by adjusting the garment accordingly.

A significant advantage of the disclosure is that the information regarding the dimensions, the wear and also the other information of the indicator elements can be evaluated automatically in the optimum case. Ultimately, it is possible to adjust and improve the garments from one generation to the next in a fully automated manner. For example, even pressure points can be detected by minimal deviations in the dimensions. All that is needed for this is a sufficiently accurate measuring device that forwards the relevant data to a process computer. This compares older previous data records of the corresponding garment with the currently determined data or data records. The process computer can then make adjustments accordingly and forward the updated data set to a manufacturing machine for production of the next generation of the garment.

Of course, depending on the garment, it may be necessary and helpful for automatically manufactured elements of the garments to be assembled by hand.

It has also proved advantageous in accordance with the disclosure if, where appropriate, the body part, for example the foot, is also measured again before the next generation of the garment is manufactured, and the data based on this is also incorporated in the optimization of the next generation of the garment. This takes into account that body parts can also change over time for various reasons. The changing body part and the garment adapted to it continue to develop simultaneously, so to speak, or in dependence on each other, so that optimum wearer comfort is maintained over a long period of time.

In principle, it is possible to measure the body parts with the aid of a data cloud, for example with a scan. In this case, a large number of data points are measured and registered, from which the shape of the body part is then determined.

In a particularly advantageous embodiment, however, the body part is measured on the basis of specific individual reference points. In fact, it has been shown that the amount of data and also the speed of the process can be considerably reduced if only the essential reference points are taken into account. Thus, only data of relevant reference points are determined.

In a particularly advantageous embodiment, the measurement of the body parts for which the garment is intended is carried out with the aid of a mobile terminal that has a digital camera.

A size reference object is required whose dimensions are known. The size reference object can, for example, be a cube or cuboid, but other objects with known dimensions can also be used.

With the help of the digital camera, several images of the body part are taken from different perspectives. It is essential that the images simultaneously include a size reference object that is located in the area of the body part. In addition to the angle of view of the perspective, it is further necessary to know the distance of the camera lens to the size reference object for the calculation of the dimensions.

In the following, the disclosure is explained for the measurement of a foot and the manufacture of a shoe, whereby the disclosure is not to be limited to this example. Rather, the foot merely exemplifies a body part to be measured and the shoe represents a manufacturing part within the meaning of the disclosure.

In a particularly advantageous embodiment, the size reference object is formed by a sheet of a specific size, for example a DIN A4 sheet. Alternatively, other sheets of standardized size can also be used, which is why the term "sheet" is used in the following. This sheet is placed on a surface and the foot to be measured is positioned on it. Afterwards, photos from different perspectives are taken with the digital camera and saved. Since the dimensions of the sheet are known, the distance of the camera lens to the sheet and the dimensions of the foot can be calculated from this.

Advantageously, the calculation or measurement of the foot can be facilitated by the fact that the images are always taken from a certain distance and from a certain viewing angle or perspective. For example, the distance of the camera lens to the foot can be 40-60 cm, preferably 50 cm. From this distance, for example, five photos are taken from different perspectives, i.e. at different viewing angles.

Taking multiple photos from different perspectives is necessary, among other reasons, because the camera can never be aligned in the correct position with respect to all reference points of the foot at the same time. For example, it is necessary for the camera to be perpendicular to certain reference points. In this respect, photos must be taken in relation to several reference points in each case.

In order to ensure that the photos are taken at the desired distance and from the various perspectives, at least one program or application can be installed on the digital terminal device which, during use, guides and helps the user, as it were, to bring the camera into the correct position in space in order to then take a picture. For this purpose, the camera preferably has a position sensor, for example a gyro sensor, with which tilting or inclining of the smartphone can be registered. It is also particularly advantageous to use an integrated compass that registers a rotation of the digital camera or smartphone about its vertical axis.

The application displays the current position of the camera in space as determined by the position sensor. This can be done, for example, by means of showing a virtual spirit level on the display of the digital terminal device.

Furthermore, a predefined auxiliary display is provided for each of the different perspectives from which images are to be captured. Via this, the correct position of the camera for taking the respective image can be set in conjunction with the current position display or can be indicated by an auxiliary alignment display.

For example, an element, for example a point, can react to the position of the camera. This element must be brought into a certain area on the display by changing the position of the camera, for example a stationary circle. If the dot is within the circle, the camera is oriented correctly.

It is possible to display different circles at different locations on the display to realize different positions of the camera over them. So if the point is guided into a first circle, the camera is in a first position, if the point is then guided into a second different circle, the camera is in a second different position, and so on. Whenever the point is in the respective circle, a picture is taken and an image is generated.

Alternatively, instead of multiple circles, only a single circle is always displayed at the same location. However, the application is programmed in such a way that bringing the point into line with the circle several times in succession leads to different positions of the camera in each case. Thus, a sequence of multiple images is captured, with the position of the dot in the circle representing a different position of the camera each time. For example, the application may prompt to take a first image, where the user must first guide the dot of the as an alignment guide in the circle. After the image is captured, a prompt to capture a second image is issued. The user must again guide the dot into the circle, with the application taking into account that the position of the camera for the next photo is different from the position of the camera for the previous photo. Thus, the point will be in the circle again when the camera is appropriately reoriented and correctly aligned.

To set the correct distance of the camera from the size reference object, auxiliary lines can still be shown on the display of the camera. For each of the different perspectives, the auxiliary lines correspond to the outer contour of the size reference object from the respective perspective, whereby the auxiliary lines must be aligned with the outer contour of the size reference object in order to capture the respective image.

For example, the lines may be displayed in red if the distance of the camera is not correct. If the auxiliary lines are positioned in alignment with the outer dimensions of the sheet, the auxiliary lines are displayed in green and the user is prompted to take a photo. This ensures that the subsequent calculation of the dimensions of the foot is given the concrete distance and the concrete position of the camera.

It has proven to be particularly easy if the application first ensures that the camera is in the correct position in space via the alignment help indicator. This can also be symbolized by a color indicator, for example a green dot in the circle of the spirit level. The camera is then moved toward the size reference object until the auxiliary lines surround it as intended. Only then is the corresponding image captured.

According to the disclosure, a sufficient number of images from different directions or perspectives are taken in this way for subsequent determination of the reference points and calculation of the dimensions.

A particular advantage can further be achieved if the sheet is preferably folded diagonally and folded up. The foot to be measured is again aligned on the sheet and the camera is brought into lateral or oblique position to the foot. Here, too, the user can refer to the application and the associated alignment aid display and auxiliary lines.

The subsequent calculation is thus not only performed in the two-dimensional direction with respect to the width and length of the sheet, but also in the Z direction via the folded-up area, i.e. taking into account the height to the foreground or to the sheet.

If a three-dimensional body is used instead of a sheet, its height can serve as a reference.

It is essential that the reference points are determined relative to each other, i.e. that they represent the actual real foot. This means that values are not determined and then linked to previously determined and stored data, as is common in the prior art. The distances between the reference points are determined by reference to the size reference object.

Suitable reference points for a foot are, for example, the free end of the big toe, the outer point of the smallest toe, the height of the arch of the foot and/or the height of the big toe above the sheet and the position of the instep of the foot. In addition, other reference points can also be determined and calculated as required.

In a subsequent step, the captured photos are preferably transferred to a computer that calculates the position of the reference points relative to each other. Advantageously, the digital terminal itself can also perform the calculations if it has sufficient computing capacity. In this respect, a computer can also be dispensed with completely.

A virtual image of the previously photographed foot can be computed from the reference points, so to speak.

The term "virtual image" is not to be understood literally, but rather functionally. Thus, it is not necessary that a visible virtual image be created that can be recognized by a user; rather, the external dimensions of the foot are to be determined. Thus, it is ultimately also possible that the virtual image is only available as a data set.

In a next process step, a data set is calculated from the three-dimensional virtual image of the foot, which contains a two-dimensional data network based on the previously calculated reference points. The three-dimensional image of the foot is converted into one or more two-dimensional surfaces. These two-dimensional data serve as manufacturing or cutting patterns for the subsequent production of shoe elements, i.e. adapted manufacturing parts. When calculating the surfaces, it may be possible to take into account whether the shoe is to have a tighter or wider fit. Tolerances that may be necessary for the subsequent connection of the shoe elements can also be included.

In principle, the invented method has four main process steps:
a) a biometric measurement of at least one body part for which the garment is intended,
b) an analysis of the data determined by the measurement and calculation of a data set for the production of manufacturing parts for the garment with indicator elements,
c) manufacturing the garment in an automated a process as far as possible,
d) generating a next data set, containing measured data of the used first garment as well as data from an evaluation of the indicator elements. If necessary, newly determined biometric data of the body part can also be taken into account.

BRIEF DESCRIPTION OF THE DRAWINGS

The disclosure is explained in more detail with reference to the following figures. These are to be understood only by way of example and are intended merely to represent embodiments of the disclosure. All features of the description can be combined with each other, even if they are not necessarily shown in context. This also applies to the features in the claims.

Shown.

DETAILED DESCRIPTION OF THE DRAWINGS

Figure 1:
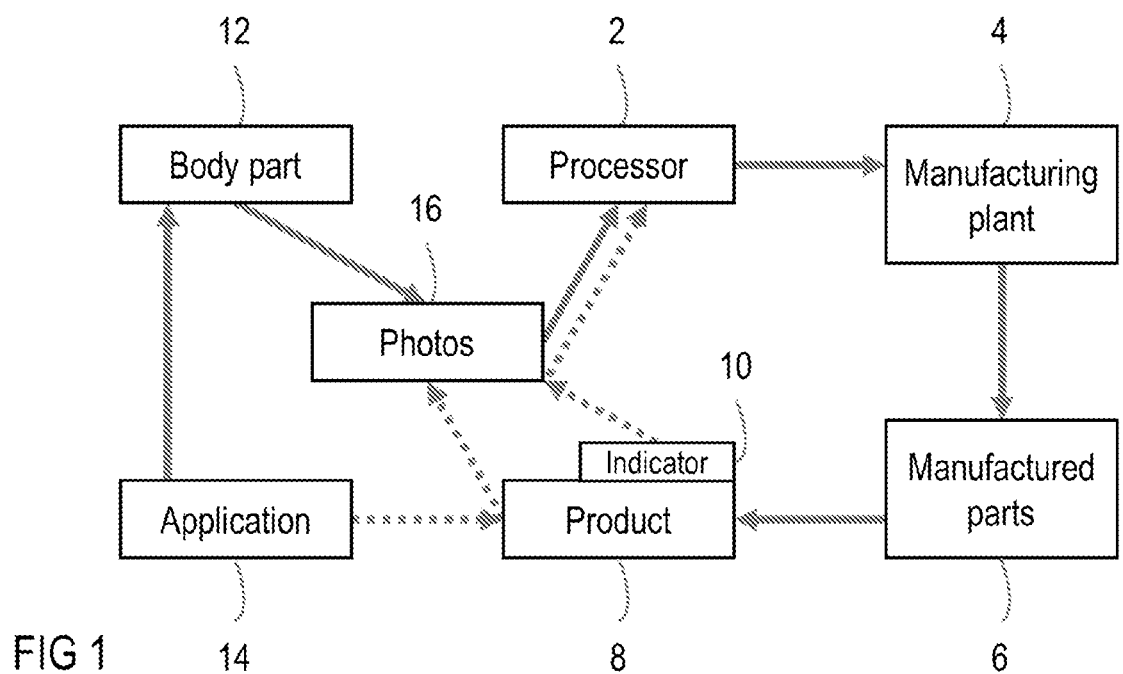
FIG. 1: a flow chart of the process according to the disclosure.

FIG. 1 illustrates the basic principle of the process according to the disclosure in a highly simplified flow chart. At the center of the process is a processor 2 which receives information and calculates data records for the manufacture of a garment (product 8). The data set of the processor 2 is transmitted to a manufacturing plant or device 4, which manufactures parts 6. The manufacturing device 4 is, for example, a CNC cutting machine. These are particularly well suited because they can be operated fully automatically and have very short setup times. A cutting die is not required, and the throughput or production speed is high. In addition, a wide variety of materials can be processed with a large selection of versatile tools.

The manufactured parts 6 are then turned into the product 8, which can be manufactured by a fully automated process, but manual processing is also conceivable. The product has indicator elements 10. These can be used, for example, to be able to detect wear of the garment or to determine other data essential for the user. Advantageously, the indicator elements 10 can be photographed after use of the product, preferably with a digital camera 26. The change in the indicator elements 10 can then be evaluated from the photos 16.

Figure 2:
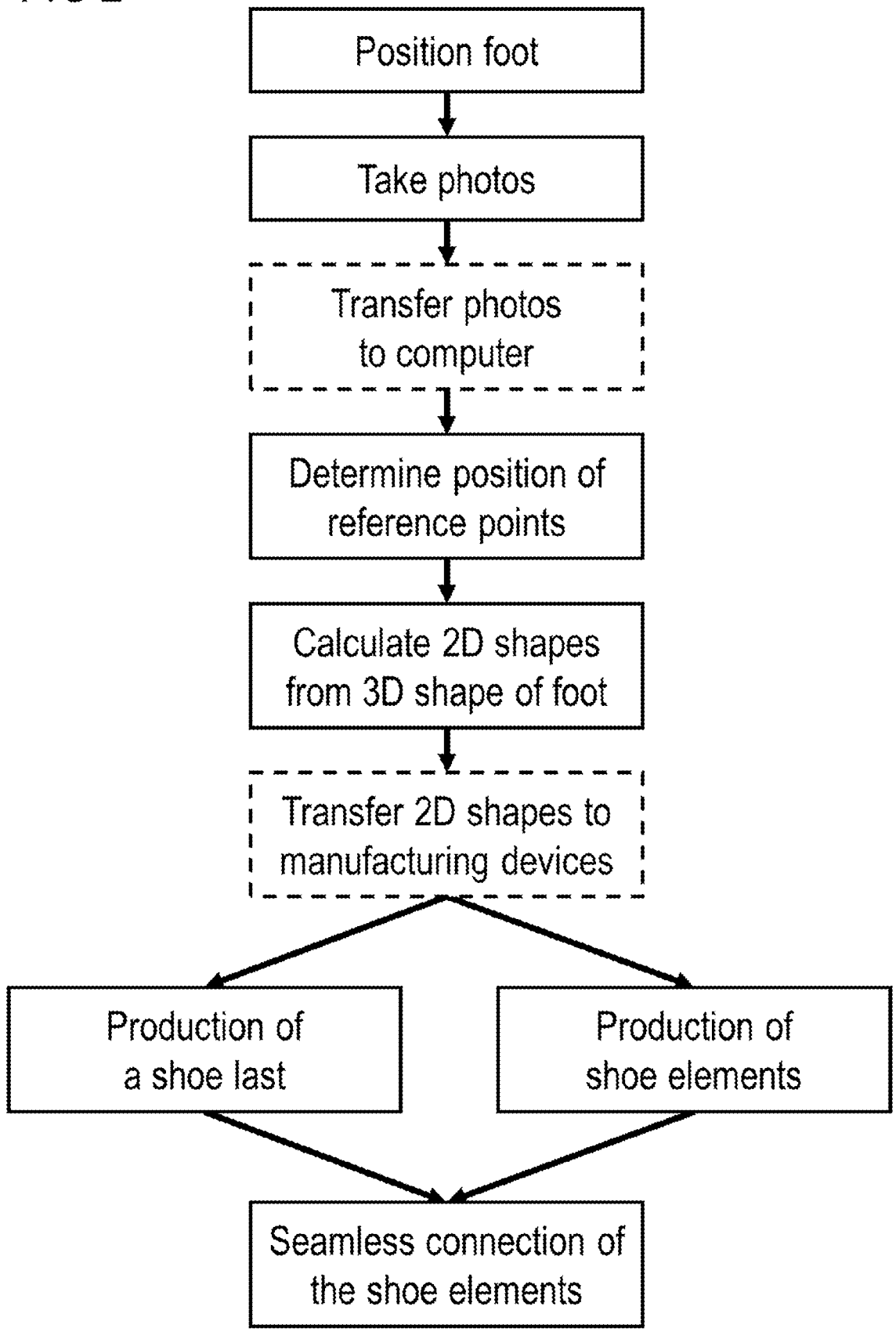
FIG. 2: a flow chart of the measurement process.

A prerequisite for calculating the data set for manufacturing the production parts 6 is the measurement of at least one body part 12. In a preferred variant, photos 16 are generated via an application 14 on a mobile terminal with a digital camera 26 (cf. FIG. 2). From the photos 16, dimensions and measurements of the body part 12 can be determined by a processor 2. The surveying method is described in detail below.

Crucial to the process according to the disclosure is the possibility to cyclically evolve the manufactured garment from generation to generation adapted to the needs of the user. To this end, according to the disclosure, feedback is determined after the garment has been used in the form of data which is incorporated into the production of the next generation of the garment. There are essentially three options available for this:
the used garment can be measured,
the indicator elements can be evaluated,
the corresponding body part can be measured again.

The resulting information is fed to the processor 2 in the form of a data record. By comparing the newly determined data set with data sets of garments of previous generations, in particular with the data set of the garment manufactured before, adjustments can be made to the data set for the manufacture of the next production parts 6, which in turn lead to improvements of the garment. This process can be repeated any number of times so that the garment can be optimized from generation to generation.

The arrows shown with continuous lines represent the manufacturing of the first garment, while the arrows with dashed lines represent the manufacturing process(es) of subsequent generations. Notably, the processor 2 receives additional information from the second generation onwards, which can be used to optimize the garment.

The process step of measuring is explained using the example of measuring a foot 20. However, as already explained, the method is also suitable for other body parts.

In the first method step, it is necessary to position the body part to be measured, in this case the foot 20, relative to a size reference object 22. The size reference object 22 can be, for example, a DIN-A4 sheet 24 (hereinafter "sheet") or another sheet standardized in size. In a particularly advantageous variation of the method, the foot is positioned with the heel in a corner of the sheet 24 such that an outer side of the foot 20 is aligned with or adjacent to a side edge of the sheet.

Images of the foot 20 are then captured on the sheet 24 using a digital camera 26. By reference to the size reference object 22, dimensions can then be derived or calculated.

Preferably, however, the images are each taken from predetermined positions. The predetermined positions of the digital camera 26 in space or relative to the foot 20 are essential for an advantageous calculation of the dimensions, since the size ratios can thus be determined reliably and quickly.

For checking and setting the correct position of the camera 26 in space, a corresponding application is preferably preinstalled on the camera device 26, which, using the integrated position sensor of the camera 26, shows, for example, a position indication on a display.

It is necessary to take several images from different directions in order to be able to determine the exact position of reference points 28 on the foot. The reference points 28 are selected in such a way that they enable the two-dimensional extension of the foot 20 in the X-direction and Y-direction as well as its height in the Z-direction. For example, it is necessary to know how high the arch of the foot 20 is, what the maximum height of a big toe 32 is, for example, or how long the toe 32 is. Of course, further reference points 28 are necessary, which make it possible to determine, for example, a width of the foot 20 in the front and rear regions and also the length of the foot 20. It has been shown that the determination of 9 to 18 reference points 28 is sufficient for the manufacture of a individually tailored shoe.

Figure 4:
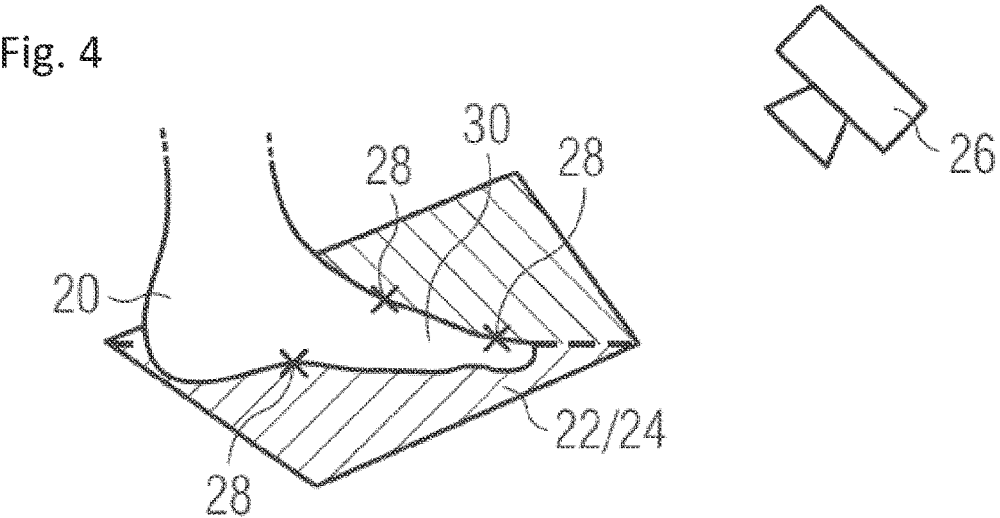
FIG. 4: a representation of a foot on a folded sheet from oblique above.

In particular, FIG. 4 illustrates how, with the aid of a sheet of paper 24, the height of the reference points 28 above the sheet 24 resting on a base can also be determined. For this purpose, after taking various images from different directions, the foot 20 is taken from the sheet 24 and the sheet is folded along a diagonal. The foot 20 is placed back on one of the two halves of the sheet 24 and the other half of the sheet 24 is folded upwards and remains in this position. This makes it possible to use the side edges and the upwardly projecting tip of the sheet 24 as a reference for points 28 of the foot 20 to be determined in further exposures.

Figure 3:
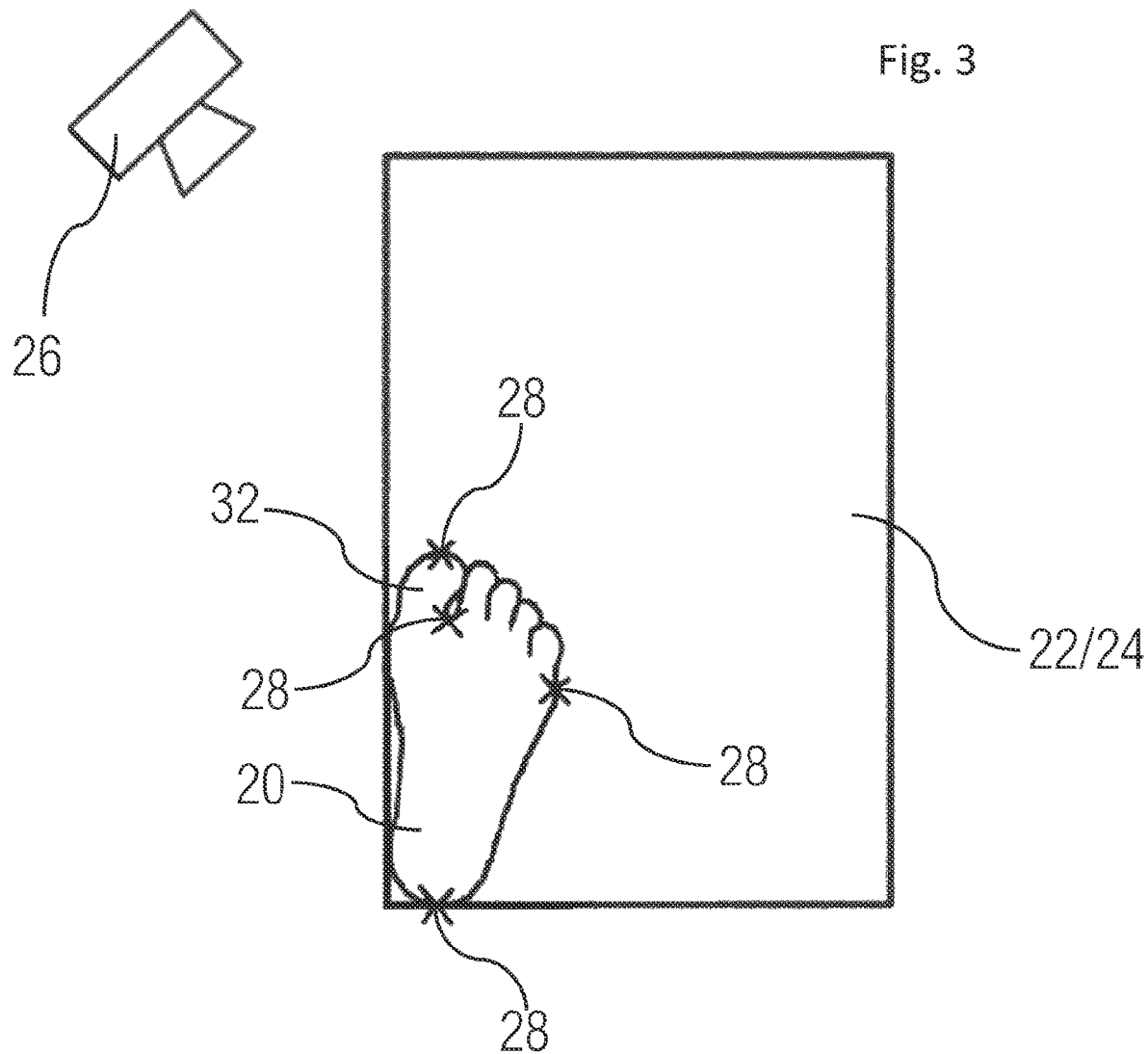
FIG. 3: a representation of a foot on a sheet from above.

In FIGS. 3 and 4, reference points 28 are drawn by way of example.

Using the images with the size reference object 22, it is possible in the next step to precisely determine the exact reference points 28 of a foot 20 in its position with respect to the reference object 22, i.e. the sheet 24, and in relation to each other. Advantageously, a suitable computer program is used for this purpose, to which the captured images is transferred. In this case, the images are transferred to a computer. Via an image analysis program, the reference points on the images are preferably found automatically and their position determined.

A virtual image of the real foot 20 can then be generated from the determined reference points 28.

In a next step, this virtual three-dimensional image of the foot 20 is used to generate a data mesh therefrom, which represents the outer surfaces of the foot. In principle, then, the outer surfaces of the foot 20 are unwound into a plane. From this two-dimensional data network, the desired production parts, in this case shoe elements, can then be determined in a next step.

Figure 5:
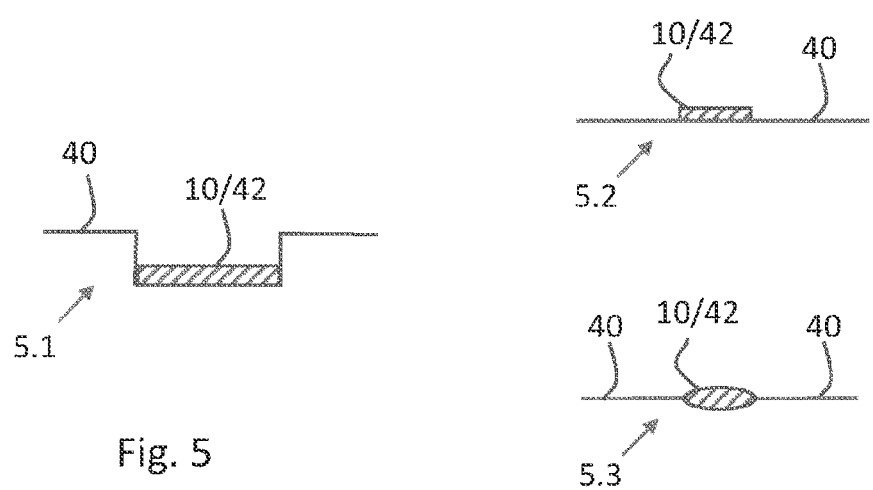
FIG. 5: three examples of an arrangement of indicator elements on the garment.

FIG. 5 shows, by way of example, three embodiment variants for the arrangement of an indicator element 10 on a garment. In the variant in FIG. 5.1, the indicator element 10 is arranged in a recess in a surface 40 of the garment. In the variant according to FIG. 5.2, the indicator element 10 is positioned in a raised position relative to the surface 40 of the garment. FIG. 5.3 shows the indicator element 10 to be a small sphere or ellipse that is woven into the surface and also changes or wears away and/or is ultimately lost. For example, the indicator element 10 may be formed merely by a layer of paint 42 that wears away with use and eventually is no longer visible. If the garment is photographed again after use with the aid of a digital camera, it can be readily determined from the data underlying the digital photographs whether or not the indicator elements 10 are still visible. If they are no longer visible, material has obviously been removed in this area. This applies to both variants, i.e. if the indicator element 10 is located in a recess or if it is raised relative to the surface 50. The indicator elements 10 can thus be used as binary data information.

Alternatively, the indicator elements 10 may have coatings that reveal different types of information. For example, maximum temperatures or pH values can be made visible by color changes.

The disclosure is not limited to the described embodiments and examples, it also includes other embodiments that can be realized by using the disclosure. For example, other areas of application for the process according to the disclosure are also conceivable, in which an article to be produced is subject to changes or wear due to its use. Conceivable are, for example, machine components, cut-to-size covered materials made of textile and the like.

The invention claimed is:

1. A method for optimizing individually tailored garments of the same type, the method including the steps of:
    a. measuring at least one body part and generating a first data set for manufacturing a first garment, including measured data of the body part,
    b. manufacturing the first garment based on the first data set, wherein the first garment comprises at least one passive, machine readable indicator element via which properties and/or changes of the first garment due to the use of the first garment by a user can be determined as a binary code,
    c. use of the first garment by the user,
    d. examining the used first garment with regard to changes due to use by the user for production of a second garment of the same type, thereby
        generating a second data set containing measured data of the used first garment,
        comparing the second data set with the first data set,
        checking the passive indicator element with regard to information relevant to the production of the second garment,
    e. generating a third data set based on the first data set, the second data set, and the result from the passive indicator element check,
    f. manufacturing the second garment based on the third data set, and
    g. repeating as necessary the previous method steps d) to f), starting from the respective last garment produced and used, for further optimization of the fit and/or the properties of a next garment to be produced.

2. The method according to claim 1, whereas at least the first data set, the second data set, and the third data set are transmitted to at least one manufacturing device which manufactures parts of the first garment.

3. The method according to claim 1, whereas the passive indicator element is configured such that the passive indicator element makes wear of the first garment detectable.

4. The method according to claim 3, whereas the passive indicator element is mechanically changeable by use of the first garment.

5. The method according to claim 1, whereas the passive indicator element is configured such that the passive indicator element makes detection of a local microclimate possible which is established within the first garment as a result of wear.

6. The method according to claim 5, whereas if the passive indicator element indicates an unfavorable microclimate for the user, the next garment is manufactured modified such that the microclimate improves during use.

7. The method according to claim 1, whereas the passive indicator element is designed as a moisture indicator.

8. The method according to claim 7, whereas ventilation openings or thinner materials are provided in the next garment to be manufactured if the passive indicator element makes an increased sweat production of the user recognizable.

9. The method according to claim 1, whereas the passive indicator element is designed as a pH value indicator.

10. The method according to claim 1, whereas the passive indicator element changes color.

11. The method according to claim 1, whereas the passive indicator element is arranged within a depression in a surface of the first garment.

12. The method according to claim 1, whereas the passive indicator element is arranged raised with respect to a surface of the first garment.

13. The method according to claim 1, whereas if the passive indicator element reveals increased wear, the next garment is manufactured mechanically reinforced in a corresponding area.

14. The method according to claim 1, whereas the first garment to be manufactured is from the group consisting of shoes, jackets, and pants.

15. The method according to claim 1, whereas information and/or data sets of further used similar garments of other users are used for optimization of the next garment to be produced.

16. The method according to claim 1, whereas before manufacturing a next generation of the garment, the corresponding body part is also measured again and a data record is generated, which is used for adapting and improving the data record for manufacturing the next generation.

17. The method according to claim 1, whereas the checking of the passive indicator element occurs with the aid of an optical device.

18. The method according to claim 1, whereas the measuring of the body part and generating the first data set based thereon comprises the following method steps:

positioning the body part relative to a size reference object, capturing images of the body part and the size reference object from a plurality of different perspectives using a digital camera, determining reference points of the body part and their relative position to each other from the captured images, generating a virtual image of the body part based on the reference points, and generating data for manufacturing the first garment to the body part.

\* \* \* \* \*